Figure 1:
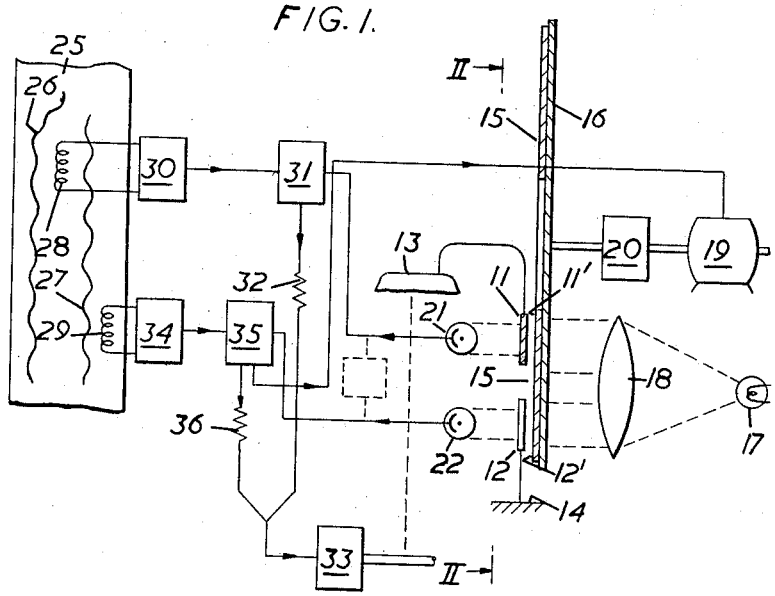

July 16, 1963 D. T. N. WILLIAMSON ETAL 3,098,186
CONTROL APPARATUS FOR POSITIONING AN OBJECT
Filed June 4, 1959 5 Sheets-Sheet 1

Inventors
David T. N. Williamson
Donald F. Walker
Alexander T. Shepherd
David W. H. Hampshire
By
Cameron, Kerkam & Sutton
Attorney

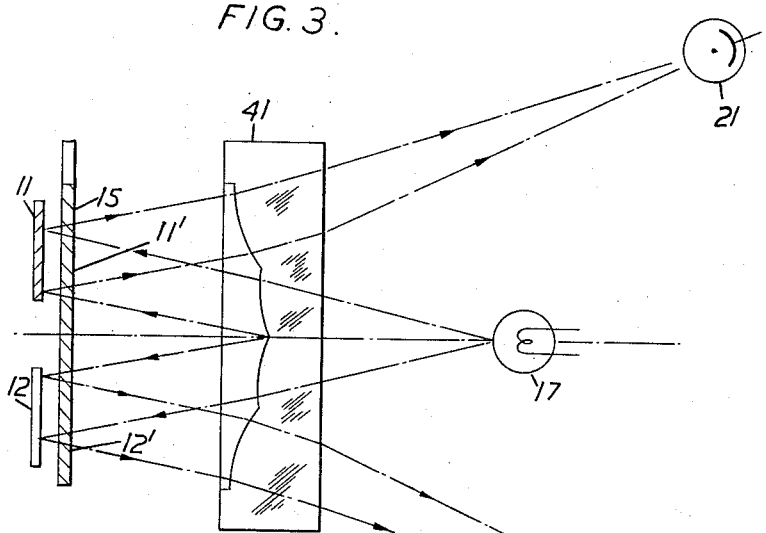
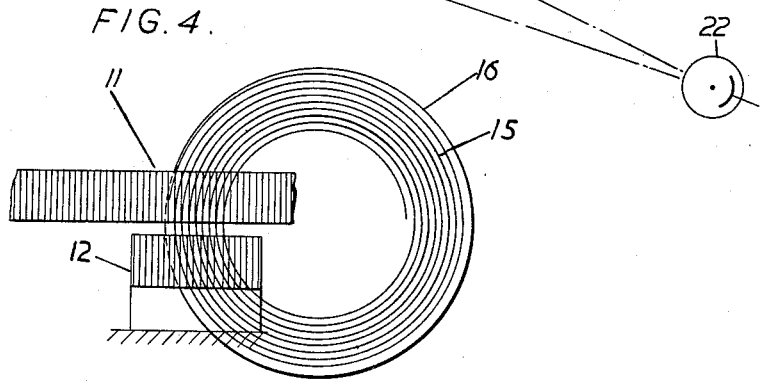
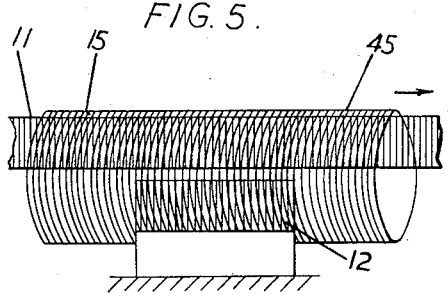

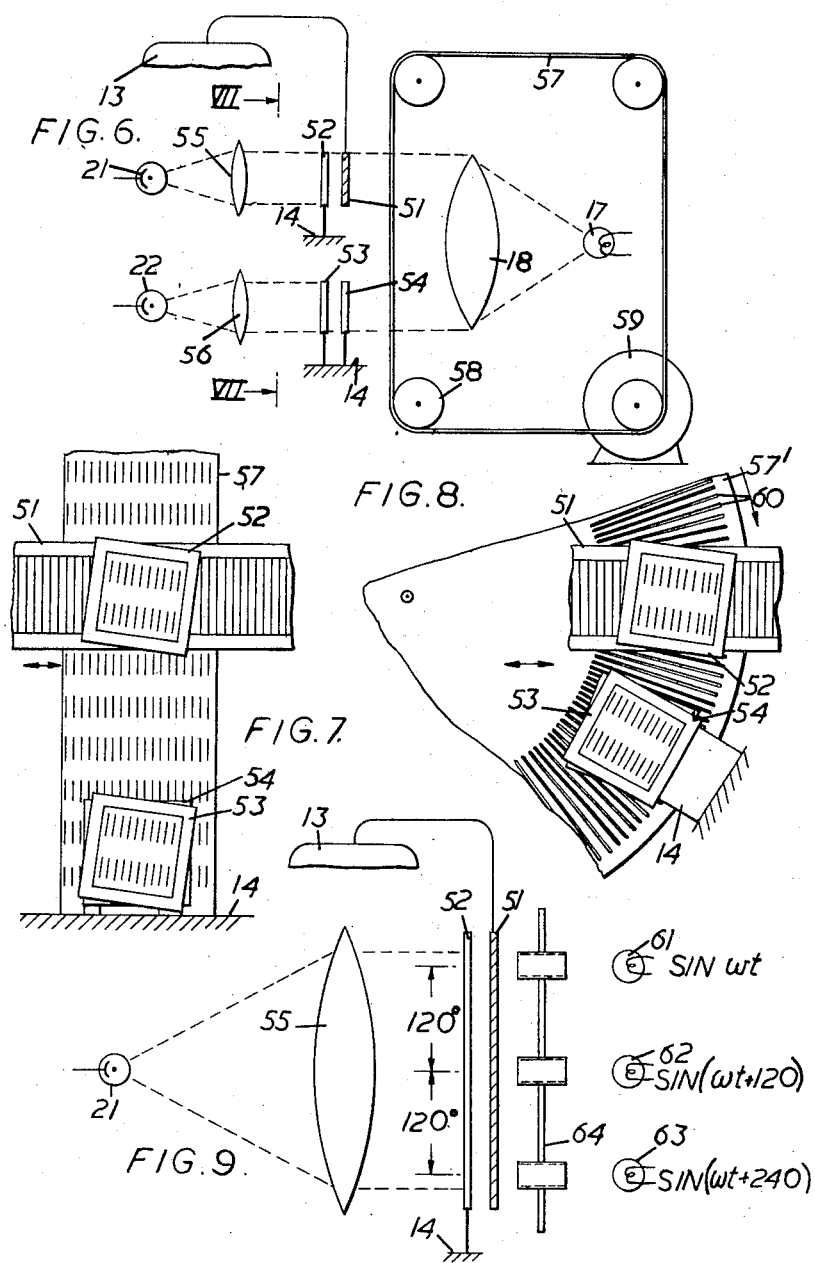

Inventors
David T. N. Williamson
Donald F. Walker
Alexander T. Shepherd
David W. H. Hampshire
By
Cameron, Kerkam & Sutton
Attorney July 16, 1963  D. T. N. WILLIAMSON ETAL  3,098,186
CONTROL APPARATUS FOR POSITIONING AN OBJECT
Filed June 4, 1959  5 Sheets-Sheet 5

INVENTORS
DAVID T. N. WILLIAMSON
DONALD F. WALKER
ALEXANDER T. SHEPHERD
DAVID W. H. HAMPSHIRE
BY
Cameron, Kerkam + Sutton
ATTORNEYS

United States Patent Office

3,098,186
Patented July 16, 1963

3,098,186
CONTROL APPARATUS FOR POSITIONING
AN OBJECT
David Theodore Nelson Williamson, Priorwood, Polton,
Donald Ferguson Walker, Barnton, and Alexander
Turnbull Shepherd and David William Holmes Hampshire, Edinburgh, Scotland, assignors to Ferranti, Limited, Lancashire, England, a company of Great Britain
and Northern Ireland
Filed June 4, 1959, Ser. No. 818,227
Claims priority, application Great Britain June 11, 1958
15 Claims. (Cl. 318—162)

This invention relates to measuring apparatus responsive to the movement of an object relative to some reference structure.

The invention has particular reference to the control of machine tools, the object being, say, the worktable and the reference structure the fixed framework of the tool. The invention will accordingly be described in this connection. It should however be understood that the invention is not limited to such applications.

It is known to control a machine tool in dependence on the relative phase of two alternating-current electrical signals of like frequency, usually derived from some sort of record or store, such as magnetic tape. One of these signals acts as a reference signal of fixed phase to provide a comparison for the varying phase of the other signal, sometimes referred to as the command signal.

In a known system for exercising this control the worktable of the tool is driven by an actuator in dependence on an error signal. This signal is derived from a phase comparison in a discriminator of the command signal, representing the required position of the table, with a signal of like frequency which is dependent in phase (with respect to the reference signal) on the actual position of the table.

The derivation of the signal which is dependent on the actual position of the table is usually effected by a rotary phase-shifter driven by a cog-and-ratchet gear from the worktable. Such a rotary electromagnetic device and others like it have the disadvantage of not being very sensitive in themselves. In order to avoid the need for a highly-sensitive phase discriminator it is therefore usual to amplify the worktable movement by means of a gear train of high velocity ratio between the cog-and-ratchet and the rotor of the phase-shifter. This also has a disadvantage in that the overall backlash of the gear train must be exceedingly small if a sensitive response is required, and to satisfy this requirement necessitates the use of a gear train of elaborate and costly design.

An object of the present advantage is to provide measuring apparatus for the purpose stated which relies on phase-comparison principles and which is simpler and less costly to manufacture than known apparatus of corresponding accuracy.

In accordance with the present invention, measuring apparatus responsive to the movement of an object relative to some reference structure includes means for setting up in operation a reference cyclic optical pattern, a first optical grating secured to said object, a second optical grating in optical registration with and movable with respect to the first grating, the gratings being ruled so as to set up, in combination with one another in operation a control cyclic optical pattern which is similar to said reference pattern and which is displaceable in phase relative thereto in dependence on the said movement of the object, a light source disposed so as to irradiate both said patterns, control and reference photocell devices disposed so as to be irradiated by light from the control or reference patterns, as the case may be, as irradiated by said source, means for causing the output signals from the photocell devices to alternate at a predetermined frequency, with a relative phase displacement equal to that of the patterns, and utilisation equipment responsive to the relative phase of the resulting alternating outputs from the photocell devices.

Also in accordance with the invention, measuring apparatus responsive to the movement of an object relative to some reference structure includes a first optical grating secured to said object, a second optical grating in optical registration with and movable with respect to the first grating, the gratings being ruled so as to set up in combination with one another in operation a control cyclic optical pattern which is displaceable in phase relative to the reference structure in dependence on the said movement of the object, a light source disposed so as to irradiate the pattern, a control photocell device disposed so as to be irradiated by light from said pattern as radiated by said source, a reference source providing a reference signal at a predetermined frequency, means controlled by said reference signal for causing the output signal from the photocell device to alternate at said frequency with a phase displacement relative to the reference signal equal to the phase displacement of the pattern relative to the reference structure, a discriminator for deriving a signal in dependence on the phase of the signal from the photocell device relative to the reference signal, and utilisation equipment responsive to the signal from the discriminator.

By the expression "cyclic optical pattern" as used throughout this specification and claims is meant a dynamic or static pattern such that the intensity of the light received by the corresponding photocell device from the pattern varies cyclically with time or with distance along the pattern, as the case may be, the waveform of the pattern being sinusoidal, rectangular (such as is formed by transparent slots across an opaque track), triangular, or of other straight-line form.

Figure 2:
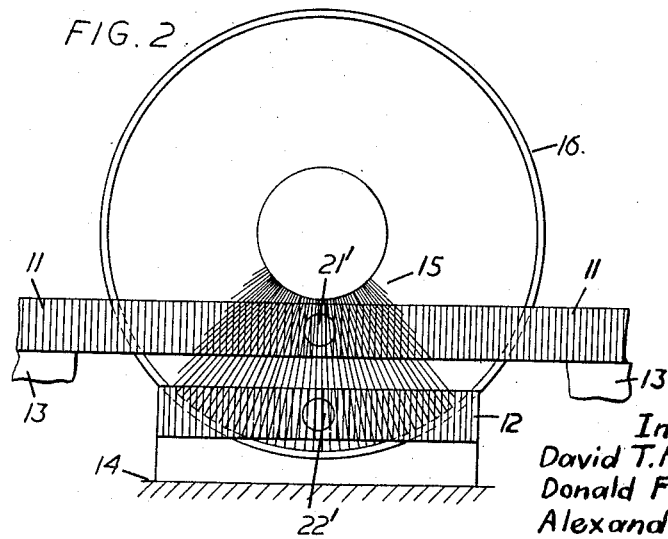
Figure 10:
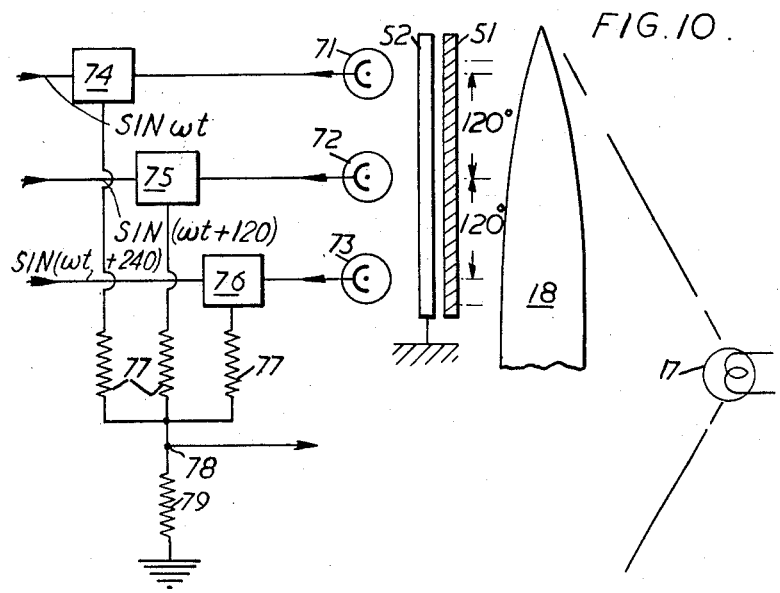
Figure 11:
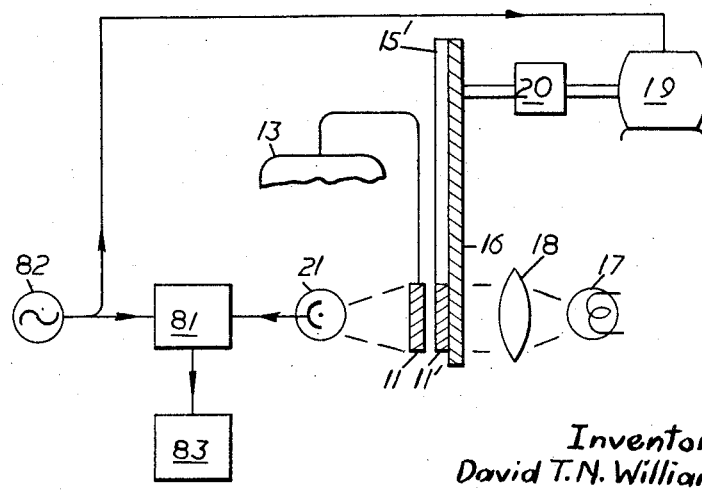
Figure 12:
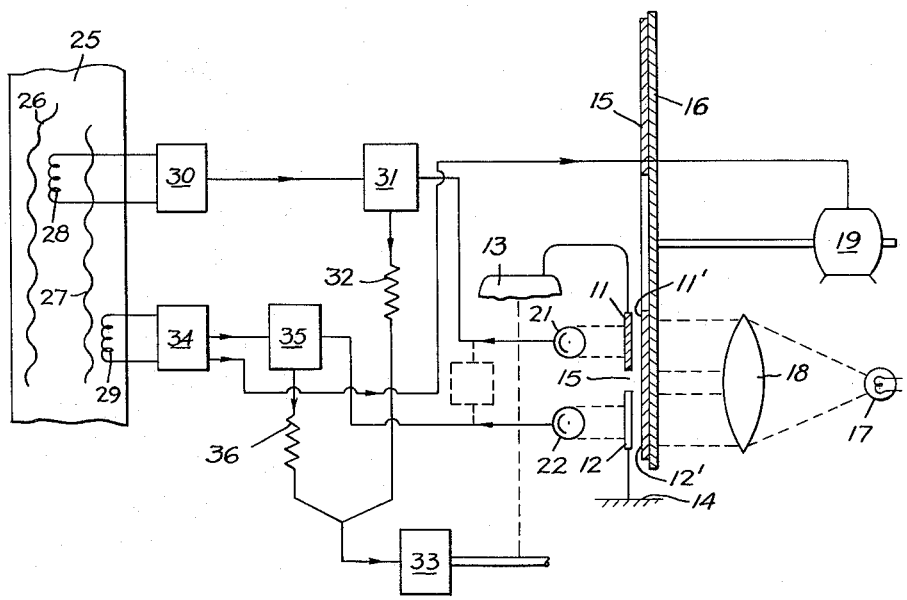

In the accompanying schematic drawings,
FIGURE 1 shows measuring apparatus in accordance with one embodiment of the invention,
FIGURE 2 is view taken on the line II, II, of FIGURE 1,
FIGURES 3 to 5 each show a part of the apparatus of FIGURES 1 and 2 modified in accordance with further embodiments,
FIGURE 6 shows a part of another embodiment,
FIGURE 7 is a view taken on the line VII, VII, of FIGURE 6 to a somewhat enlarged scale,
FIGURE 8 shows an alternative form of the apparatus of FIGURE 7,
FIGURES 9 and 10 show parts of two further embodiments, and
FIGURES 11 and 12 show further modified forms of the apparatus of FIGURE 1.

In carrying out the invention in accordance with one form by way of example, measuring apparatus for the servo control of a machine tool includes first and third optical gratings 11 and 12 (see FIGS. 1 and 2) secured to the worktable 13 of the tool and to its fixed framework 14 respectively. Each grating consists of straight parallel opaque lines ruled on a transparent base, the thickness of lines and spacings being preferably the same. The lines are of equal pitch in the two gratings—that is to say, the number of lines per inch is the same in each grating. A fairly coarse ruling, such as 100 lines to the inch, has been found to be quite satisfactory. The gratings are located close to one another and coplanar, with the lines of one grating aligned in the same direction as, though not necessarily in actual alignment with, the lines of the other grating.

Another grating 15 in the form of a transparent disc 16 with opaque lines ruled radially is disposed so as to provide in effect second and fourth gratings $11^1$ and $12^1$ in optical registration with gratings 11 and 12 respectively. By "optical registration" is meant that a beam of light can traverse gratings 11 and $11^1$ together, or gratings 12 and $12^1$ together. The lines of the combined grating 15 are spaced angularly so that the circumferential spacing at a radius equal to that to a point midway between gratings 11 and 12 is the same as the spacing of those gratings.

Arrangements are made for rotating disc 16 by a motor 19 operating through a reduction gear 20. The speed of rotation of the disc is fairly slow, but is nevertheless high enough for its lines to traverse the lines of gratings 11 and 12 considerably faster than the rate of movement of grating 11 relative to grating 12. The speed of motor 19 is controlled by a servo error signal, as explained later. For the moment it will be assumed that the speed is constant.

On one side of the gratings is a light source in the form of a lamp 17 with a collimating lens 18 to pass parallel beams of light through the two pairs of gratings to irradiate two photocell devices in the form of two photocells 21 and 22 (hereinafter referred to as the control and the reference photocells respectively) on the other side. The light beams, as seen by the photocells, are indicated in FIG. 2 at $21^1$ and $22^1$. Source 17 thus irradiates cell 21 by way of a light path including gratings $11^1$ and 11 but not grating 12, and cell 22 by way of another light path including gratings $12^1$ and 12 but not grating 11.

The operation of the equipment so far described is as follows.

When the apparatus is in operation and accordingly disc 16 is rotating (assuming for the moment that table 13 is stationary) the combination of the moving radial lines of grating 15 with the fixed parallel lines of gratings 11 and 12 results in the setting up by each effective pair of gratings 11, $11^1$, and 12, $12^1$, of a cyclic optical pattern (as above defined) of bands of light and shade moving steadily across the light path between source 17 and the photocell concerned.

These patterns, which are similar to one another, will be referred to as the control and reference patterns respectively. They are what may be described as coincidence patterns, since each is formed by the variable extent of coincidence of the lines of one grating with the lines of the other, and are dynamic patterns, since they vary with time rather than with distance along the pattern. They are somewhat complex, because in each pair of gratings the effective grating constant is less at the inner radial end of the lines of grating 15 than at the outer radial end, but at least one area, such as indicated at $21^1$ and $22^1$ in FIG. 2, of the field of each pair of gratings may be found where the bands of the pattern are sufficiently well defined, are sufficiently separated, and move in a direction sufficiently near to right angles to their length, to enable a photocell to respond to the passage of each band.

The intensities of the light beams reaching the cells are thus varied by the patterns in such manner that the output from each cell is an A.C. signal having a predetermined frequency dependent on the speed of rotation of disc 16, this frequency being the same in each cell.

So long as table 13 remains stationary the phase relationship between the two patterns and hence between the photocell signals remains constant. But as soon as the table begins to move with respect to frame 14, and in consequence grating 11 begins to move with respect to grating 12, a relative phase displacement occurs between the patterns, and hence between the photocell signals, in accurate proportion to the extent of the movement of the table. The disc and its drive may thus be considered as forming means for causing the output signals from the photocells to alternate at this predetermined frequency with the relative phase displacement referred to.

The worktable movement may thus be accurately determined from a comparison of the relative phases of the photocell signals in utilization equipment in the form of a phase discriminator connected between the photocells as depicted in broken lines. With gratings ruled at 100 lines per inch the displacement through a distance of one line spacing—i.e. through 0.01"—of grating 11 results in a phase shift of 360 degrees; and as a normal phase discriminator is sensitive to phase shifts of 1% of 360 degrees, measurements to 0.0001" may be effected without the need for expensive components.

The use of photocell 22 to provide a reference signal for phase comparison has the effect of preventing any errors that might otherwise have been caused through inaccurate operation of motor 19 or imperfections in gearing 20 or fluctuations of the lighting supply or irregular response of the lamp 17, for the effect on the output of cell 21 due to such causes is accompanied by an identical effect on the output of cell 22 and so does not appear in the phase comparison.

The accurate measurement of worktable movement derived from such a phase-shift response may be used for the servo control of a machining operation in dependence on some command signal by means of the remaining equipment shown in FIG. 1, which is also utilization equipment in accordance with the invention.

A magnetic tape 25 carrying command and reference tracks represented at 26 and 27 is moved steadily past pick-off coils 28 and 29 responsive to the signals recorded in those tracks respectively. The command and reference signals, as derived by the pick-offs, are alternating voltages having the same frequency and representing the desired position of the worktable in terms of the varying phase of the command signal with respect to the fixed phase of the reference signal.

After amplification in an amplifier 30 the command signal is applied as one of the two inputs of a phase discriminator 31 for phase comparison with the output of the control photocell 21, applied as the other input. The error signal output from the discriminator is applied through a resistor 32 to a servo-actuator 33 (which may take the form of a motor) arranged to control the position of worktable 13.

Similarly the recorded reference signal from the tape is applied after amplification at 34 to a discriminator 35 for phase comparison with the output from the reference photocell 22, the resulting error signal being applied by way of a resistor 36 to actuator 33.

The connections from the discriminators to the actuator are such that the actuator is operated in dependence on the difference between the error signals, the direction of operation being dependent on which error signal is the greater.

The error signal from discriminator 35 is also applied to motor 19 so as to control its speed.

The operation of this further equipment will first be described on the assumption that motor 19 is rotating disc 16 steadily at a desired predetermined speed corresponding to the frequency of the signals derived from the tape. Under these circumstances the reference signal from cell 22 is in constant phase relationship with the recorded reference signal from the tape. Discriminator 35 thus develops an error signal of fixed value, which is such as to maintain motor 19 operating at the appropriate speed. The control of actuator 33 is thus effected in dependence on the phase of the signal from photocell 21 relative to the phase of the command signal from the tape in the usual follow-up servo manner, the steady error signal from discriminator 35 having merely a bias effect.

The function of discriminator 35 and the two reference signals applied to it from the tape and from cell 22 respectively is to control the speed of motor 19 in servo manner by the error signal from the discriminator so as to maintain a fixed relationship between the phase of the reference signal from cell 22 and the phase of the recorded reference signal from the tape. The application of this error signal to actuator 33 serves to eradicate any residual error in the speed of rotation of disc 16; for if the disc should depart from the predetermined speed the resulting change in the error signal from discrimnator 31 due to the fortuitous change of the phase of the signal from cell 21 is compensated by a like change in the error signal from discriminator 35; in other words the difference between the error signals remains unchanged, with the result that the error at the disc does not reach the actuator.

It will of course be appreciated that as different parts of grating 15 serve as gratings $11^1$ and $12^1$ in optical registration with the other two gratings, grating 15 may be physically in two parts, in optical registration with the other two gratings 11 and 12, each to each.

In an alternative arrangement for the drive to disc 16, motor 19 is of the synchronous or hysteresis kind and is driven by the output from amplifier 34, as shown in FIG. 12, so that under perfect conditions of the drive to the disc the phase of the signal from cell 22 is locked to that of the reference signal from the tape. Any errors due to the drive appear in both error signals and so do not reach the actuator, as in the case of the embodiment first described.

In another alternative arrangement motor 19 is a two-phase induction motor energised independently to run somewhat faster than would a synchronous motor synchronised to the reference signal. The output from discriminator 35 is applied to the motor as an eddy-current brake, thereby reducing the speed of the motor to the value required by the reference signal.

The grating system may be modified in numerous ways within the scope of the invention. For example, the widths of the transparent and opaque lines need not be equal. It is however generally desirable that the transparent lines should not be wider than the opaque lines; for if they were wider, the opaque lines of one grating of a pair would never fully occult the transparent lines of the other and this wounld reduce the amplitude of the output signal from the photocell.

In another modification one grating of each pair—either gratings $11^1$ and $12^1$ or gratings 11 and 12—may be on a reflective rather than a transparent base, the photocells and the source being on the same side of the three gratings. One such arrangement will now be described with reference to FIG. 3, in which the components already depicted are indicated by their previous reference numbers.

In this arrangement combined grating 15 is on a transparent base as before but gratings 11 and 12 are formed by light-absorptive lines on a light-reflecting surface. To direct the light beams use is made of a special four-part prismatic lens 41. The two inner parts of the lens divide the light from source 17 into two collimated beams and direct them through gratings $11^1$ and $12^1$ to gratings 11 and 12 respectively. Here the beams are reflected back through gratings $11^1$ and $12^1$ and are brought to a focus at the respective photocells 21 and 22 by the outer parts of the lens. The cells are of course shielded from direct illumination by the source. The operation of this arrangement is otherwise the same as that of FIG. 1, the cyclic light-and-shade optical patterns being set up as before.

In another modification (not shown), for a rotational rather than a linear movement of the worktable, gratings 11 and 12 may be radial as well as grating 15, the arrangement being such that disc 16, the worktable, and gratings 11 and 12 are concentric. Such angular movements may alternatively be measured by concentric cylindrical gratings.

To obviate the need for a reduction gear 20, grating 15 on disc 16 may be in the form of a spiral, as shown in FIG. 4, such that one revolution of the disc effectively advances the grating in a radial direction through a distance equal to the pitch of the spiral, the pitch being here the grating constant. The modification shown in FIG. 12, wherein the motor 19 is controlled by the output from amplifier 34, embodies the spiral grating 15 of FIG. 4 and omits the reduction gear 20 of FIG. 1. Grating 15 thus again provides at any given moment the gratings $11^1$ and $12^1$ in optical registration with gratings 11 and 12 respectively.

A similar effect may be obtained by replacing disc 16 by a cylinder 45 (see FIG. 5) with the grating now in helical form on the surface of the cylinder and the lamp (not shown) inside it. Here a single rotation of cylinder 45 effectively advances grating 15 in a axial direction to the extent of the helical pitch.

Instead of moving disc 16 or its cylindrical counterpart 45, gratings $11^1$ and $12^1$ may be fixed and the light source moved instead, the gratings being sufficiently spaced apart to provide the necessary light-and-shade pattern. In such a modification the light source may be the spot of a cathode-ray tube in which the appropriate timebase is synchronised to the recorded reference signal. Such a scanning spot may alternatively be derived from some sort of mirror-drum or other mechanical/optical device.

In another form of the means for causing the output signals from the photocells to alternate—see FIGS. 6 and 7—the control pattern is set up by first and second optical gratings 51 and 52 secured to the worktable 13 and to the fixed framework 14 respectively. The gratings are each ruled with straight parallel lines—see FIG. 7—and are located in close optical registration with one another with the lines of one grating—conveniently grating 52—slightly skew with respect to the lines of the other grating. Grating 52 is carried by a mounting (omitted to simplify the drawing) which allows a fine adjustment of the skew angle. The lines are of equal pitch in the two gratings and the thickness of the lines is equal to the width of the spaces between them. Because of their skew relationship the gratings set up in combination with one another the control pattern in the form of a cyclic optical pattern (as above defined) of approximately triangular waveform in a direction parallel to the rulings. The pattern is static, that is, it varies cyclically with distance along the pattern rather than with time, and hence is in existence even when the apparatus is not operating. Movement of the worktable causes grating 51 to move in a direction normal to its rulings, as indicated by the arrows.

The reference pattern is set up by a similar pair of skew gratings 53 and 54 both of which are fixed in positions such that the reference pattern is aligned in the direction of the control pattern. As these gratings are fixed they may be replaced by a single optical screen on which the pattern is formed by, say, a photograph of the control pattern.

The effect of movement of the worktable is to displace the control pattern in the direction of the pattern—that is, at right angles to the direction of movement—and hence to effect a phase displacement of the control pattern relative to the reference pattern.

The two patterns are irradiated by a light source 17 and a collimating lens 18 from which the light passes in parallel beams through the patterns to the respective cells 21 and 22 as before, the beams being brought to a focus on the cells by lenses 55 and 56. The beams are wide enough in the direction of the pattern for each cell to be irradiated by the light from several cycles—three or four, say—of the pattern.

The signals are caused to alternate not by rotating one of the gratings of each pair relative to the other as in the above-described embodiments but by causing the light path between the light source and the patterns to be traversed by a member having an optical track which varies cyclically in density in the direction of the movement of the member. The member may take the form of an endless film 57 having an optical track which varies sinusoidally in density in the direction of movement, that direction being parallel to the directions of the patterns. The wavelength of the density pattern on the film is approximately equal to that of the control and reference patterns. The film is carried on rollers 58 and is driven by a motor 59 the speed of operation of which is controlled as is the speed of motor 19 which rotates disc 16 in the embodiment of FIG. 1.

In operation, when the worktable is stationary, the effect of the moving film is to cause the intensity of the light passing to the cells, and hence the output signals from them, to alternate at a frequency determined by the speed of movement of the film and the wavelength of its density pattern, the relative phase of the signals being determined by the relative phase of the control and reference patterns. When the worktable moves, the corresponding phase displacement of the control pattern relative to the reference pattern effects a like displacement of the phase of the control signal relative to the reference signal; this phase displacement is measured, or made use of for servo control of the worktable, as already described.

The cyclically variable track carried by the film may alternatively take the form of narrow transparent slots in an otherwise opaque track, the slots being normal to the direction of movement and spaced apart at distances equal to the wavelength of the control and reference patterns. The width (that is, the shorter dimension) of each slot should be a fraction of the wavelength of the patterns; good results are obtained with slot widths of the order of a quarter to two-thirds of the wavelength. Each cell is irradiated by the light from several cycles of the control and reference patterns as before.

In this embodiment it may be more convenient to replace the film by a rotating disc $57^1$—see FIG. 8—in which the slots 60 are radial. The disc has a large enough diameter for the slots to be sufficiently close to being in parallel with one another for the apparatus to operate efficiently. The disc is rotated at a controlled speed as is the disc 16 of the FIG. 1 arrangement.

The film, whether its track is slotted or of variable density, or the slotted disc, may alternatively be located between the gratings and the focusing lenses, its effect on the intensity of the light passing to the cells, and in consequence on the signals from the cells, being the same as before.

The variable-density film when located between the light source and the gratings as in the arrangement of FIG. 6 may, together with the source itself, be replaced by a cathode-ray tube (not shown) having a long-persistence screen on which the moving density pattern is traced. The pattern on the screen is not projected optically onto the gratings, for if it were, the angle of incidence of light on the gratings would vary with the movement of the screen pattern; instead, the tube is located with its screen close to the gratings.

In all these arrangements of film or slotted disc the adjustment of the angle of skew of grating 52 enables the wavelength of the control pattern to be made equal to that of the pattern of the film or disc. The reference pattern would require similar adjustment, and for this reason may more conveniently be set up by the two gratings 53 and 54, rather than by a single screen bearing a pattern which is not thus adjustable.

The effect of the cyclically-varying optical track on the film or the disk when located between source and gratings as in the embodiments of FIGS. 6 to 8 may be produced by means as depicted in FIG. 9, which shows the equipment supplied for the control pattern only. In this arrangement the light source is in the form of three lamps 61 to 63 energised at the desired frequency of the photocell signals from a three-phase supply so that the intensity of the light from lamp 62 lags by 120° on the intensity of the light from lamp 61, and lamp 63 lags similarly by 120° on lamp 62. By means of a screen 64 having tubular apertures disposed between the lamps and the gratings the light from the respective lamps passes through three elements of the control pattern displaced 120° apart, as indicated; the total light from all three elements (but no light from the rest of the pattern) is focused onto cell 21 by a lens 55.

Similar arrangements are made for the reference pattern, preferably using the same three lamps 61 to 63 so that any irregularities in their response affect both signals equally and so do not affect their relative phase.

If $w$ is the periodicity of the three-phase supply (corresponding to the desired frequency of the photocell signals) and $\theta$ is the phase of the control pattern relative to the reference pattern the total intensity of the light reaching cell 21 is proportional to the sum of the products $$\sin wt \quad \sin \theta$$
$$\sin (wt+120) \quad \sin (\theta+120)$$
$$\sin (wt+240) \quad \sin (\theta+240)$$

the amplitude constants being omitted. By evaluating these quantities it can be shown that the signal derived from cell 21 is proportional to $\sin (wt \pm \theta)$. On the other hand the signal derived from cell 22 is proportional to $\sin wt$, with the result that the phase difference between the signals is representative of the position of the table, as before.

The means of the embodiment of FIG. 9 for causing the signals to alternate may be modified as shown in FIG. 10. Here the light source is in the form of a single lamp 17 steadily energised to irradiate the whole control pattern by lens 18 as in the first-described embodiments. This time the photocell device instead of being in the form of one cell is in the form of three cells 71 to 73 located, and if necessary screened, to be respectively irradiated by light coming from three elements of the control pattern spaced 120° apart. The three-phase supply in this arrangement is applied together with the output signals from the three cells to three multiplier stages 74 to 76, each to each. These stages may each take the form of a discharge tube mixer stage or a corresponding semiconductor stage. The outputs from the three multiplier stages are connected through three like resistors 77 to a common point 78 which is connected to earth through a fourth resistor 79.

In operation, stage 74 supplies an output proportional to the product $\sin wt \sin \theta$ again omitting amplitude constants), stage 75 an output proportional to the product $\sin (wt+120) \sin (\theta+120)$, and so on, the sum of these products, as derived from common point 78, being again proportional to $\sin (wt \pm \theta)$.

Similar arrangements are provided in respect of the reference pattern.

It is not essential to employ a reference pattern. Measuring apparatus in accordance with the invention which does not use such a pattern is shown in FIG. 11. The apparatus is to some extent similar to that described with reference to FIG. 1, and accordingly like components are given the same reference numbers. As there is no reference pattern, gratings 12 and $12^1$ of FIG. 1 are omitted and the grating (now designated $15^1$ carried by disc 16 is reduced in radial depth since it only has to supply the grating $11^1$. The output from cell 21 (the control signal) is applied as one of the two inputs to a phase discriminator 81. The motor 19 is driven from a reference A.C. source 82, which also supplies the other input signal (the reference signal) to the discriminator. The output signal from the discriminator, the value of which is dependent on the relative phase of the two input signals, is applied to utilisation equipment in the form of some convenient measuring instrument 83, having a centre zero.

The apparatus opeates in a similar manner to that of the embodiment first described, with source 82 taking the place of the reference gratings 12, $12^1$, and photocell 22. The arrangement is such that when the worktable 13 occupies a datum position the relative phase of the control and reference signals is such that instrument 83 indicates the centre zero.

Any movement of the table in one or other direction from the datum position shifts the phase of the control signal to a corresponding extent in the appropriate direction relative to the reference signal, the discriminator output changes correspondingly, and the instrument 83 indicates the sense and direction of the worktable's movement.

Any change in the frequency of the source causes the speed of motor 19 to change correspondingly. Thus both the reference and the control signals are affected alike, with the result that their phase difference and hence the reading of instrument 83 are not affected.

As indicated above, the apparatus illustrated in FIG. 12 is similar to that of FIG. 1, and operates in a manner similar thereto, except that the grating 15 of disc 16 is of spiral form, as shown in FIG. 4, the reduction gear 20 of FIG. 1 is omitted, and the motor 19, which drives the disc 16, is of the synchronous or hysteresis type and is controlled by the output from amplifier 34.

In any of the above-described embodiments the "illumination" provided by the source may be of the invisible kind, such as infra-red rays, the photocells being of course of the sort responsive to such irradiation.

The gratings have been described as being formed with transparent and opaque lines so that the patterns set up by two gratings in combination are of the coincidence kind. Alternatively, the gratings may be diffraction gratings, so that the cyclic optical patterns are diffraction patterns.

Apparatus in accordance with the invention is thus seen to afford a highly accurate means of measuring, or controlling in dependence on accurate measurements, the movement of a body with respect to a reference structure without requiring any elaborate or expensive components.

We claim:

1. Measuring apparatus responsive to the movement of an object relative to a reference structure including means for producing a reference cyclic optical pattern, a first optical grating secured to said object, a second optical grating in optical registration with and movable with respect to the first grating, the gratings being ruled so as to set up in combination with one another a control cyclic optical pattern which is similar to said reference pattern and which is displaceable in phase relative thereto in dependence on the movement of the object relative to the reference structure, a light source for irradiating said patterns, control and reference photocell devices so disposed as to be irradiated by light from the irradiated control and reference patterns, respectively, means for causing the output signals from the photocell devices to alternate at a predetermined frequency, with a relative phase displacement equal to that of the patterns, and utilisation equipment responsive to the relative phase displacement of the alternating output signals from the photocell devices.

2. Apparatus as claimed in claim 1 wherein said means for causing the output signals from the photocells to alternate includes a movable member having an optical track which varies cyclically in density in the direction of movement of the member, and means for causing said member to move across the light path between the light source and the photocell devices in a direction parallel to the direction of said control and reference patterns and at a speed such as to cause the output signals from the photocell devices to alternate at said predetermined frequency.

3. Apparatus as claimed in claim 2 wherein said track is provided with transparent slots spaced apart at distances equal to the wavelength of said patterns, the track being otherwise opaque.

4. Apparatus as claimed in claim 2 wherein said track varies in density sinusoidally at a wavelength equal to that of said patterns.

5. Apparatus as claimed in claim 1 wherein said light source includes a group of three lamps for irradiating each of said patterns, and said means for causing the output signals from the photocells to alternate includes means for energising the three lamps of each group at said predetermined frequency but at phase displacements of 120° with respect to one another, and screening means for ensuring that the light from said lamps irradiates only three elements, each to each, of each pattern at corresponding phase displacements of 120°, the photocell device associated with each pattern being irradiated by light from the said three irradiated elements of the pattern.

6. Apparatus as claimed in claim 1 wherein the photocell device of each pattern includes a group of three photocells arranged to be irradiated by the light from three elements, each to each, of that pattern at phase displacements of 120° with respect to one another, said elements being irradiated by said light source, and said means for causing the output signals from the photocells to alternate includes a multiplier stage for multiplying the output signal from each cell by a signal at said predetermined frequency, the three multiplying signals applied to the output signals of the three cells of each group being at phase displacements of 120° with respect to one another, and means for adding together the product signals from the multiplier stages.

7. Apparatus as claimed in claim 1 wherein said gratings are ruled with parallel straight lines of equal pitch in the two gratings, the lines of one grating being slightly skew with respect to the lines of the other grating, whereby said control pattern is set up in approximately the direction of said lines.

8. Apparatus as claimed in claim 1 wherein the means for producing the reference pattern includes third and fourth gratings optically similar to said first and second gratings respectively, the third grating being secured to said reference structure, and said means for causing the output signals from the photocells to alternate includes a member carrying the second and fourth gratings and rotatable with respect to the first and third gratings, and means for rotating the member at a speed such as to cause the output signals from the photocell devices to alternate at said predetermined frequency.

9. Apparatus as claimed in claim 8 wherein the rotatable member comprises a disc carrying radial rulings forming the second and fourth gratings.

10. Apparatus as claimed in claim 8 wherein the rotatable member comprises a disc carrying at least one spiral ruling forming the second and fourth gratings.

11. Apparatus as claimed in claim 8 wherein the rotatable member comprises a cylinder containing said light source and carrying at least one continuous helical ruling on the surface thereof forming the second and fourth gratings.

12. Apparatus for controlling the movements of an object relative to a reference structure of the type wherein the required position of said object relative to the reference structure at any given moment is represented by the phase at that moment of a recorded command cyclic signal relative to a recorded reference cyclic signal of like frequency, comprising means for producing a reference cyclic signal and a command cyclic signal of the same frequency as but of varying phase relative to the reference signal, means for producing a reference cyclic optical pattern, a first optical grating secured to said object, a second optical grating in optical registration with and movable with respect to the first grating, the gratings being ruled so as to set up in combination with one another a control cyclic optical pattern which is similar to said reference pattern and which is displaceable in phase relative thereto in dependence on the movement of the object relative to the reference structure, a light source for irradiating said patterns, control and reference photocell devices so disposed as to be irradiated by light from the irradiated control and reference patterns, respectively, means for causing the output signals from the photocell devices to alternate at a predetermined frequency, with a relative phase displacement equal to that of the patterns, and utilisation equipment responsive to the relative phase displacement of the alternating output signals from the photocell devices including a first phase discriminator for deriving a first error signal in dependence on the phase of said command signal relative to the output signal from the control photocell device, a second phase discriminator for deriving a second error signal in dependence on the phase of said reference signal relative to the output signal from the reference photocell device, synchronising means for controlling said means for causing the output signals from the photocells to alternate to synchronise said predetermined frequency to said frequency of the reference and command signals, and a servo actuator for effecting said movement of the object in dependence on the difference between said error signals.

13. Apparatus as claimed in claim 12 wherein said synchronising means includes means for controlling said means for causing the output signals from the photocells to alternate in dependence on said second error signal.

14. Measuring apparatus responsive to the movement of an object relative to a reference structure including a first optical grating secured to said object, a second optical grating in optical registration with the first grating, the gratings being ruled so as to set up in combination with one another a control cyclic optical pattern which is displaceable in phase relative to the reference structure in dependence on the movement of the object relative to the reference structure, a light source for irradiating the pattern, a control photocell device so disposed as to be irradiated by light from said irradiated pattern, a reference source providing a reference signal at a predetermined frequency, means controlled by said reference signal for causing the output signal from the photocell device to alternate at said frequency with a phase displacement relative to the reference signal equal to the phase displacement of the pattern relative to the reference structure, a discriminator for deriving a signal in dependence on the phase of the signal from the photocell device relative to the reference signal, and utilisation equipment responsive to the signal from the discriminator.

15. Apparatus as claimed in claim 14 wherein said light source includes a group of three lamps, and said means for causing the output signal from the photocell device to alternate, includes means for energising said three lamps at said predetermined frequency but at phase displacements of 120° with respect to one another, and screening means for ensuring that the light from the lamps irradiates only three elements, each to each, of the pattern at corresponding phase displacements of 120°, the photocell device being irradiated by light from the said three irradiated elements.

References Cited in the file of this patent

UNITED STATES PATENTS 2,694,804     Wagner _____ Nov. 16, 1954

FOREIGN PATENTS 760,321     Great Britain _____ Oct. 31, 1956

OTHER REFERENCES

Engineering: p. 66, June 11, 1954, published by Engineering Ltd., London W.C. 2, 35 Bedford St., Strand.

Computer Controller Machine Tools, D. T. N. Williamson Aircraft Production, pp. 267–272, July 1955, published by Illiffe and Sons Ltd., London SE. 1, Dorset House, Stamford St.